United States Patent Office 3,285,954
Patented Nov. 15, 1966

3,285,954
THIOMETHYLENEPHOSPHINIC ACIDS
Eugene H. Uhing, Evergreen Park, and Arthur Dock Fon Toy, Park Forest, Ill., assignors to Stauffer Chemical Company, New York, N.Y., a corporation of Delaware
No Drawing. Filed Feb. 19, 1962, Ser. No. 174,280
9 Claims. (Cl. 260—500)

The present invention relates to thiomethylenephosphinic acids, salts thereof, and the process of producing such compounds.

The new thiomethylenephosphinic acid compounds may be illustrated by the general formula:

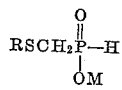

wherein R may be selected from the group consisting of hydrogen, alkyl, aryl, alkaryl, aralkyl and substituted phenyl radicals, and M represents hydrogen or alkali metal cations.

These new compounds may be made by the reaction of chloromethylphosphinic acid, and salts thereof, with organic mercaptans, alkali metal hydrosulfides and sulfides in the presence of an aqueous solution of at least a stoichiometric proportion of an alkali metal base according to the following reaction:

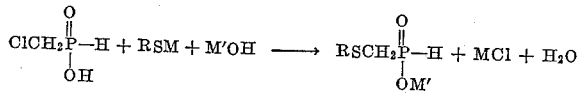

wherein M represents hydrogen or an alkali metal atom, and M' represents an alkali metal atom, which may be the same or a different metal than M, and R may be selected from the group consisting of hydrogen, M, alkyl, aryl, alkaryl, aralkyl and halogenated phenyl radicals. In general, the reaction is carried out under refluxing conditions at temperatures in the order of 80° to 140° C. for a sufficient period to complete the conversion of the chlorine of the chloromethyl group to ionic chlorine forming metal chlorides with basic M or M' metal ions. In the cases where M is hydrogen, an amount of M' must be present to at least correspond stoichiometrically with the amounts of the chlorine and acidic hydrogen atoms present in the reaction mixture. In general, the reaction is carried out at atmospheric pressure, but may be carried out under pressure, especially in cases where the RSM reactant is highly volatile, for example, where hydrogen sulfide is employed.

Suitable organic mercaptans for use in the present invention include generally the alkyl and aryl compounds which contain at least one functional —SH or —SM radical where M is an alkali metal. Organic mercapto compounds of this type include alkylmercaptans, phenylmercaptan, chlorophenylmercaptan, dichlorophenylmercaptan, aminophenylmercaptan, thioglycine, thioformic acid, hydroxyalkylmercaptans, chloroalkylmercaptans, and methyl substituted phenylmercaptans.

In carrying out the reaction to produce the thiomethylenephosphinic acid products, sodium hydrosulfide and alkali metal sulfides decomposable in aqueous solution to liberate hydrosulfide radicals may be employed. Such inorganic bases may be employed, at least in part, to furnish the alkalinity necessary to neutralize the reactants at the reaction stage. However, it is preferable to employ the alkali metal bases, such as sodium hydroxide, potassium hydroxide and the alkali metal carbonates to furnish the neutralizing and reaction-promoting alkalinity.

The chloromethylphosphinic acid starting material may be prepared in accordance with the method described in U.S. patent application, Serial No. 65,018 (filed October 26, 1960 and now abandoned) which comprises hydrolyzing chloromethylphosphonous chloride with water and removing the by-product HCl by vacuum.

In the following examples, it is preferred to carry out the reactions in a non-oxidizing atmosphere, suitably an atmosphere of nitrogen to avoid partial oxidation of the phosphinic radical.

*Example 1.—Octylthiomethylenephosphinic acid*

In a reaction flask, equipped with a reflux condenser, was placed 0.02 mole of octyl mercaptan, 0.02 mole of chloromethylphosphinic acid and 0.04 mole NaOH in 40 ml. of water. Two layers were present. On heating for two hours at a refluxing temperature of about 100° C., the top layer disappeared. The reaction mixture was then evaporated to dryness to give a mixture of sodium chloride and the sodium salt of octylmercaptomethylenephosphinic acid. The mixture was then neutralized with 0.02 mole of HCl and the acid product extracted with ethanol. After evaporating off the alcohol, a 94% yield of the octylthiomethylenephosphinic acid was obtained. The product had a neutralizing equivalent of 232 compared to 224 for the compound $C_8H_{17}SCH_2PO_2H_2$. The product has an index of refraction $N_D^{25}=1.4898$.

*Example 2.—Octylthiomethylenephosphonic acid*

A portion of the octylthiomethylenephosphinic acid from Example 1 was dissolved in water and 102% of the theoretical amount of $HgCl_2$ was added and the mixture heated at reflux temperature for 2 hours to oxidize the phosphinic radical to the phosphonic radical. After cooling, the HgCl formed was filtered off and the filtrate evaporated to dryness giving a 99% yield of the octylthiomethylenephosphonic acid. Analysis showed 13.4% P and 13.8% S compared to theoretical values of 12.9% P and 13.35% S for the formula $C_8H_{17}SCH_2PO_3H_2$. The product had a melting point of 68° to 70° C.

*Example 3.—Laurylthiomethylenephosphinic acid*

In a three neck 500 ml. flask equipped with stirrer, reflux condenser, and thermometer was placed 60.6 grams (0.3 mole) of lauryl mercaptan, and 34.2 grams (0.3 mole) of chloromethylphosphinic acid. Then 24 grams (0.6 mole) of NaOH in 75 ml. of water was added and the mixture heated at 100° C. for three hours. The water was then evaporated off under reduced pressure and the product extracted with ethyl ether. The product was placed in 200 ml. of water and 0.4 mole HCl added. The solid product was removed by filtration to give a crude yield of 70.8 grams (84% yield). The product was purified by forming the calcium salt, extracting with ether and again forming the free acid by neutralizing with HCl. Substantially pure laurylthiomethylenephosphinic acid was obtained in a yield of 75%. It had a neutralizing equivalent of 283 compared to the theoretical value of 280.4 for the formula $C_{12}H_{25}SCH_2PO_2H_2$. The product had a melting point of 35° to 36° C.

*Example 4.—Phenylthiomethylenephosphinic acid*

In a three neck 500 ml. flask equipped with stirrer, reflux condenser, and buret was placed 0.4 mole of chloromethylphosphinic acid and 50 ml. of water. Then 0.4 mole of NaOH in 50 ml. water was added, followed by the addition of 0.4 mole phenyl mercaptan. The reaction materials were heated in an atmosphere of nitrogen to 80° C. and kept alkaline during the reaction by adding small amounts of 12 N NaOH as needed. A total of 0.4 mole NaOH was added in this manner. The reaction product was then heated to 100° C. for 2 hours. After cooling, the product was acidified with 45 ml. of concentrated HCl. The reaction mixture separated into two layers. The thick oily bottom layer was separated as the desired phenylthiomethylenephosphinic acid product in a 99% yield. It had a neutralizing equivalent of 198 compared to the theoretical value of 189 for the formula $C_6H_5SCH_2PO_2H_2$. This product has an index of refraction $N_D^{25} = 1.6046$.

*Example 5.—Chlorophenylthiomethylenephosphinic acid*

Following the reaction conditions of Example 3, chlorobenzenethiol was reacted with chloromethylphosphinic acid to give a 98% yield of a water insoluble reaction product after separating by filtration. The chlorophenylthiomethylenephosphinic acid obtained had a neutralizing equivalent of 233 compared to the theoretical value of 221 for compound $ClC_6H_4SCH_2PO_2H_2$.

To illustrate the utility of the above product as an intermediate, 33 grams were suspended in water and heated with 90 grams $HgCl_2$ whereby the $HgCl_2$ was reduced to HgCl and the phosphinic radical oxidized to the phosphonic radical. The resulting chlorophenylthiomethylenephosphonic acid was obtained in 93% yield. Titration with caustic soda showed the product to be a dibasic acid having the correct molecular weight for $ClC_6H_4SCH_2PO_3H_2$.

*Example 6.—Mercaptomethylenephosphinic acid*

A solution of sodium hydrosulfide was prepared by adding hydrogen sulfide to an aqueous solution of NaOH in a reaction flask. To this solution was added a stoichiometrically equivalent amount of sodium salt of chloromethylphosphinic acid. The reaction mixture was heated at 100° C. for three hours. The resulting reaction product was the acidified with HCl and evaporated to dryness. It was extracted with ethanol from the sodium chloride formed by the reaction. After evaporating off the ethanol there was obtained a 95% yield of the substantially pure mercaptomethylenephosphinic acid product having a neutralizing equivalent corresponding to the theoretical value of 112 for the compound $HSCH_2PO_2H_2$.

The new compounds of this invention have a variety of uses including use as antioxidants for petroleum products, stabilizing agents for vinyl resins, plasticizers, surface active agents, agricultural chemicals, metal extractants in solvent extraction, and as chemical intermediates for forming phosphonic acids and derivatives thereof.

In order to illustrate the utility of the foregoing compounds, or their phosphonic acid derivatives as rustproofing agents, the following tests were conducted using 2 cm. squares of mild steel which were approximately 3 mm. thick. The squares were first washed in trichlorethane to remove any grease and then placed in the dilute hydrochloric bath (20 mm. of concentrated HCl and 80 ml. water) at 90° C. for one hour to remove any rust and scale. They were then washed 7 to 8 times in distilled water to remove any trace of acid, washed twice in ethanol, and stored in ethanol until treated.

Test solutions were made by dissolving one gram of the particular compound to be tested in 10 ml. of ethanol. The steel squares were placed in the test solution and allowed to stand for 5 minutes. They were then removed and dried at 110° C. for 30 minutes. The control square received identical treatment except that the ethanol did not contain any test compound.

Following the completion of the treatment, these squares were placed on watch glasses and left on the laboratory shelf for 8 months. They were than inspected and the area of rust formation and a thickness of the rust layer were judged qualitatively as compared to the control. The control was considered to be 100% rusted with a heavy layer of rust. The results of the tests are given in tabular form as follows:

TABLE I

| Test Compound | Area Rusted, Percent | Thickness of Rust Layer |
|---|---|---|
| Control | 100 | Heavy. |
| Octyl-$SCH_2PO_3H_2$ | 25 | Light. |
| 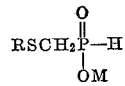—$SCH_2PO_3H_2$ | 80 | Medium. |
| Cl—⟨⟩—$SCH_2PO_3H_2$ | 80 | Do. |

The foregoing description is given for clearness of understanding only, and no unnecessary limitations should be derived therefrom.

We claim:
1. A thiomethylenephosphinic acid compound of the formula:

$$RSCH_2\overset{O}{\underset{OM}{P}}-H$$

wherein:
(a) R is selected from the group consisting of alkyl, aryl, alkaryl, aralkyl, and halophenyl, and
(b) M is selected from the group consisting of hydrogen and alkali metals.
2. Octylthiomethylenephosphinic acid.
3. Laurylthiomethylenephosphinic acid.
4. Phenylthiomethylenephosphinic acid.
5. Chlorophenylthiomethylenephosphinic acid.
6. Alkali metal salts of octylthiomethylenephosphinic acid.
7. Alkali metal salts of lauryl thiomethylenephosphinic acid.
8. Alkali metal salts of phenylthiomethylenephosphinic acid.
9. Alkali metal salts of chlorophenylthiomethylenephosphinic acid.

References Cited by the Examiner

Maguire et al.: "Chem. Soc. Jour.," 1957, pp. 311–314.
Phillips, "Australian Jour. of Chem.," vol 12, pp. 199–204 (1959).
Reid, "Organic Chemistry of Bivalent Sulphur," vol. 1, pp. 25–29 (1958); vol. 2, pp. 24–49 (1960).
Uhing et al.: "Jour. Am. Chem. Soc.," vol. 83, pp. 2299–2302 (1961).
U.S.S.R. Biulleten Isobretinii 1958, No. 7, p. 48 (Abstract of U.S.S.R. Patent No. 114,022).

LEON ZITVER, *Primary Examiner.*